US010650339B2

(12) United States Patent
Kim et al.

(10) Patent No.: US 10,650,339 B2
(45) Date of Patent: May 12, 2020

(54) ASSESSMENT METHOD AND SERVER FOR DEBT MANAGEMENT COMPETENCY

(71) Applicant: AJOU UNIVERSITY INDUSTRY-ACADEMIC COOPERATION FOUNDATION, Suwon-si, Gyeonggi-do (KR)

(72) Inventors: Do Yeong Kim, Suwon-si (KR); Jun Su Park, Seoul (KR); Gyoung Hwan Kim, Seoul (KR); Keon Ho Kim, Busan (KR); Do Won Kim, Gangneung-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 286 days.

(21) Appl. No.: 15/603,545

(22) Filed: May 24, 2017

(65) Prior Publication Data

US 2018/0204479 A1   Jul. 19, 2018

(30) Foreign Application Priority Data

Jan. 17, 2017   (KR) .......................... 10-2017-0008063

(51) Int. Cl.
| G06Q 10/06 | (2012.01) |
| G09B 7/02 | (2006.01) |
| G09B 19/18 | (2006.01) |
| G09B 5/02 | (2006.01) |

(52) U.S. Cl.
CPC ......... *G06Q 10/06398* (2013.01); *G09B 7/02* (2013.01); *G09B 19/18* (2013.01); *G06Q 10/067* (2013.01); *G09B 5/02* (2013.01)

(58) Field of Classification Search
CPC .. G09B 19/18; G06Q 40/00; G06Q 10/06398; G06Q 10/0637; G06F 17/5009
USPC ......................................................... 434/107
See application file for complete search history.

(56) References Cited

U.S. PATENT DOCUMENTS

| 5,966,700 A * | 10/1999 | Gould .................... G06Q 40/00 705/35 |
| 2010/0248192 A1* | 9/2010 | Thompson ............. G09B 19/18 434/107 |

FOREIGN PATENT DOCUMENTS

JP    2013-205672 A    10/2013

OTHER PUBLICATIONS

Communication dated Apr. 30, 2018, issued by the Korean Patent Office in counterpart Korean Application No. 10-2017-0008063.

(Continued)

*Primary Examiner* — Jerry-Daryl Fletcher

(74) *Attorney, Agent, or Firm* — Sughrue Mion, PLLC

(57) ABSTRACT

Provided are a method and a server for assessing a debt management competency, which provide a determination reference for inducing and educating an individual to rationally make a decision on a debt redemption by progressing the rounds by the predetermined number of times, selecting a specific debt among the plurality of debts and setting the amount of money to be repaid for the debt in an income for each round, setting an assessment grade for a user according to a debt settlement amount calculated in a final round, and providing a user with feedback information according to an assessment grade.

16 Claims, 11 Drawing Sheets

(56) References Cited

OTHER PUBLICATIONS

Eliane Alhadeff, "Serious Games Help Students Build a Positive Credit History", Serious Game Market, pp. 1-8, Jul. 21, 2016 http://www.seriousgamemarket.com/2016/07/serious-games-help-students-build.html.

Lyle Hansen et al., "Night of the Living Debt", Northwest Youth Financial Education, University of Idaho, Dec. 21, 2017. http://www.uidaho.edu/extension/4h/programs/nw-youth-financial-ed/programs/living-debt.

Grant Johnson, "The Night of the Living Debt Review", Blog at Worldpress.com, Videogame Reviews, pp. 1-2, Nov. 18, 2016 https://gjohns26.wordpress.com/2016/11/18/the-night-of-the-living-debt-review/.

* cited by examiner

[FIG. 1]
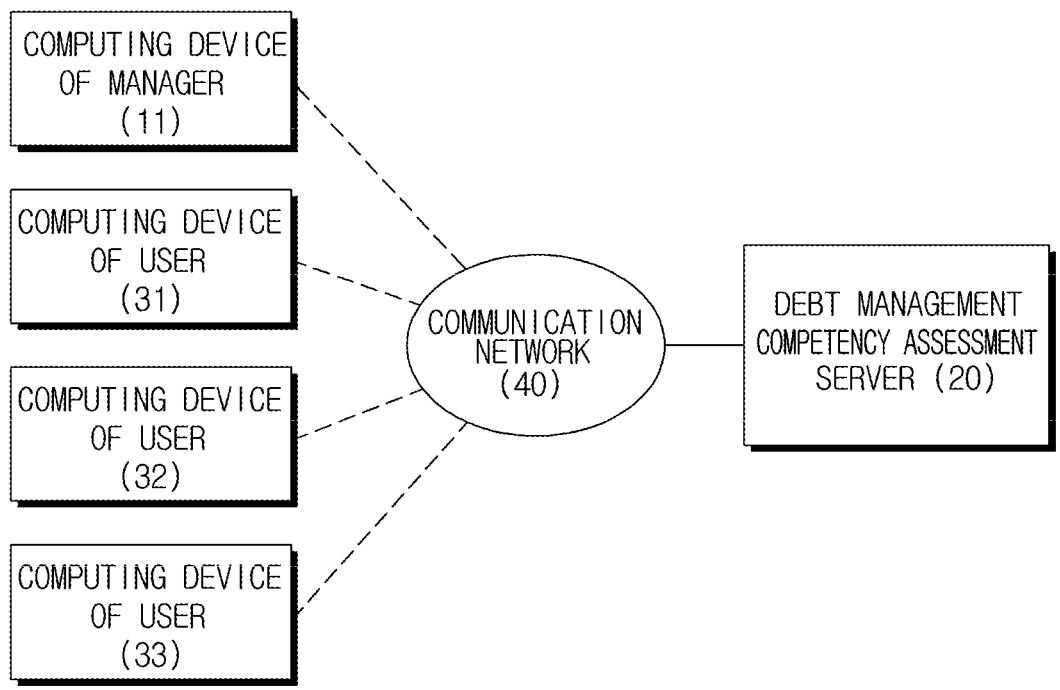
[FIG. 2]
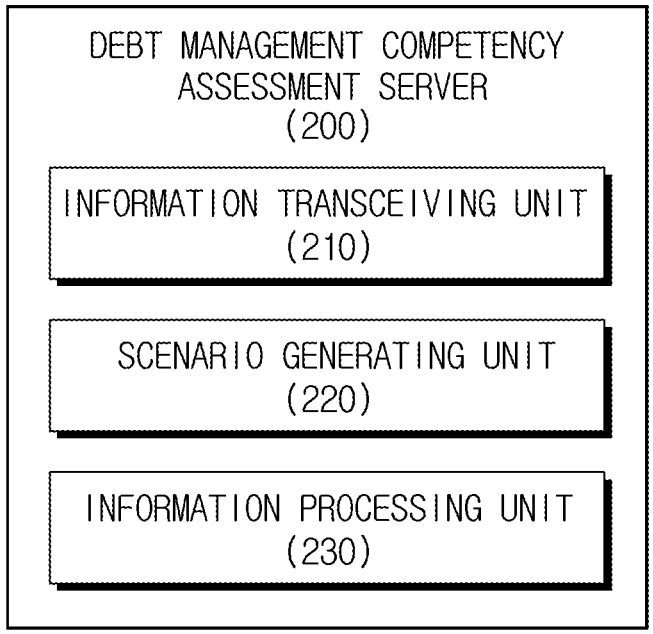

[FIG. 3]
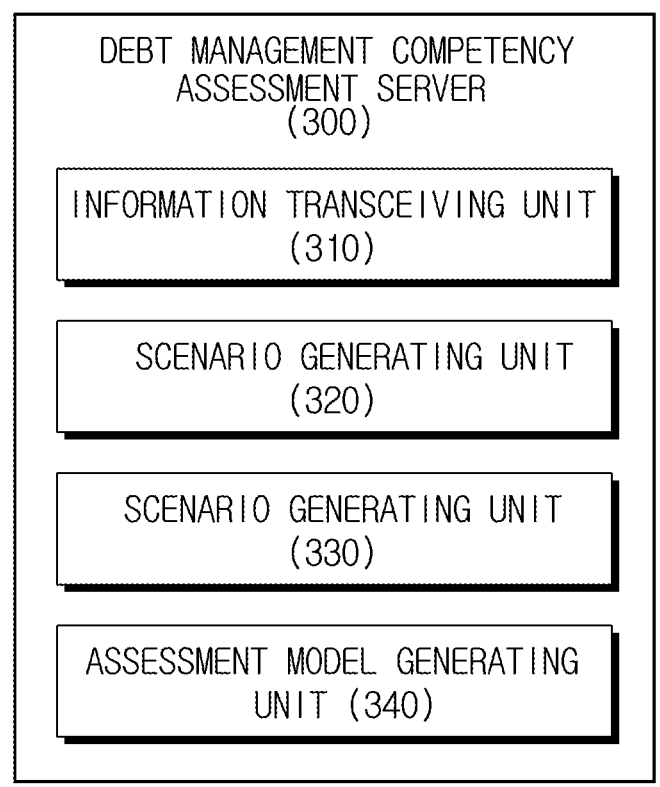

[FIG. 4]

| | | |
|---|---|---|
| ACTIVATION | ■ | |
| SCENARIO NAME | | |
| DEBT DISPLAY OPTION | ☐ | Normal |
| | ■ | Prospective |
| | ☐ | Retrospective |
| | ☐ | Retroprospective |
| MAXIMUM ROUND | 25 | |
| BONUS ROUND | 6, 12, 19 | |
| BONUS AMOUNT | 2000, 15000, 40000 | |
| SAVING MODE | ☐ | |
| DISPLAY OF ELAPSED TIME | ☐ | |

[FIG. 5]

| DEBT NAME | INITIAL DEBT AMOUNT | INTEREST RATE |
|---|---|---|
| A | 3000.00 | 2.50 |
| B | 8000.00 | 2.00 |
| C | 11000.00 | 3.50 |
| D | 13000.00 | 3.25 |
| E | 52000.00 | 3.75 |
| F | 60000.00 | 4.00 |

| | |
|---|---|
| INITIAL ASSETS | 5000 |
| FIXED INCOME | 5000 |
| CURRENCY SIGN | $  ☐ FRONT ■ BACK |
| URL: PRE-SURVEY URL | |
| URL: POST-SURVEY URL | |

[FIG. 6]
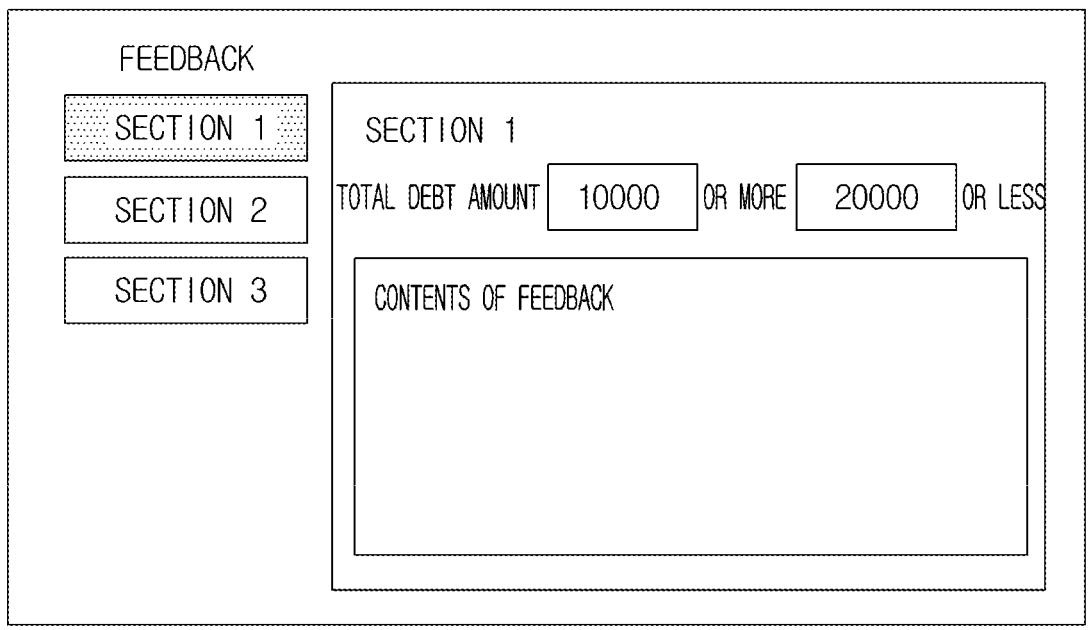

[FIG. 7]

| ANNUAL INCOME | |
|---|---|
| FIXED INCOME | 5000.00 |
| BONUS | 0.00 |
| PROGRESS SITUATION | |
| PRESENT ROUND | 10 |
| AVAILABLE CASH | 5000.00 |
| TOTAL DEBT AMOUNT | 147000.00 |
| REDEMPTION PLAN | |
| DEBT NAME | REDEMPTION AMOUNT |
| A | |
| B | |
| C | |
| D | |
| E | |
| F | |

RESET    APPROVAL

[FIG. 8]

DEBT INFORMATION IN PRESENT ROUND

| DEBT NAME | PRESENT BALANCE | INTEREST RATE | MAXIMUM INTEREST INCREASED AMOUNT (ON ANNUAL BASIS) |
|---|---|---|---|
| A | 3000.00 | 2.50 | 75.00 |
| B | 8000.00 | 2.00 | 160.00 |
| C | 11000.00 | 3.50 | 385.00 |
| D | 13000.00 | 3.25 | 422.50 |
| E | 52000.00 | 3.75 | 422.50 |
| F | 60000.00 | 4.00 | 2400.00 |

[FIG. 9]

| DEBT INFORMATION IN FINAL ROUND ||| 
|---|---|---|
| DEBT NAME | FINAL BALANCE | INTEREST RATE |
| A | 5561.89 | 2.50 |
| B | 13124.86 | 2.00 |
| C | 4538.89 | 3.50 |
| D | 1113.98 | 3.25 |
| E | 10014.02 | 3.75 |
| F | COMPLETE REDEMPTION | 4.00 |

[FIG. 10]
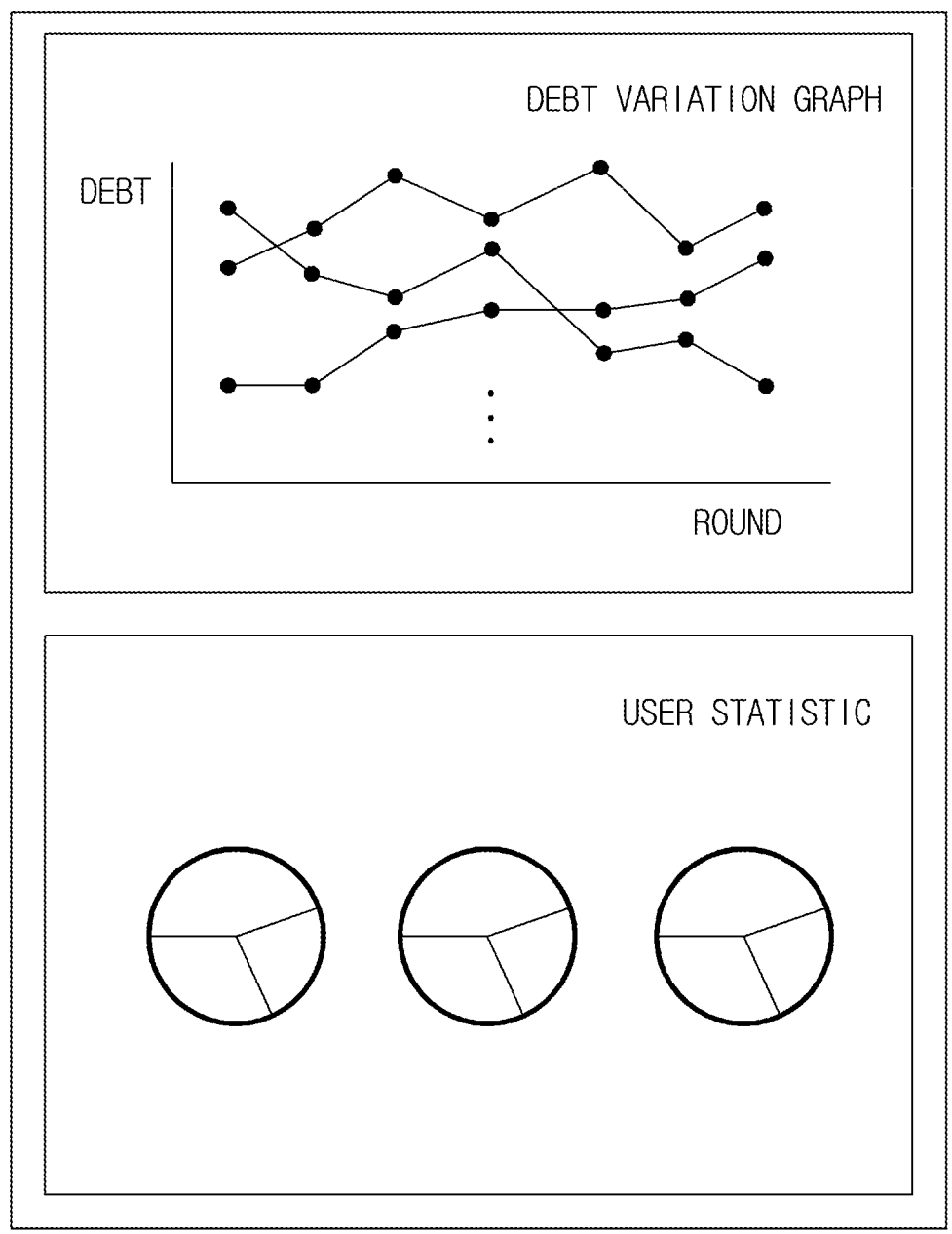

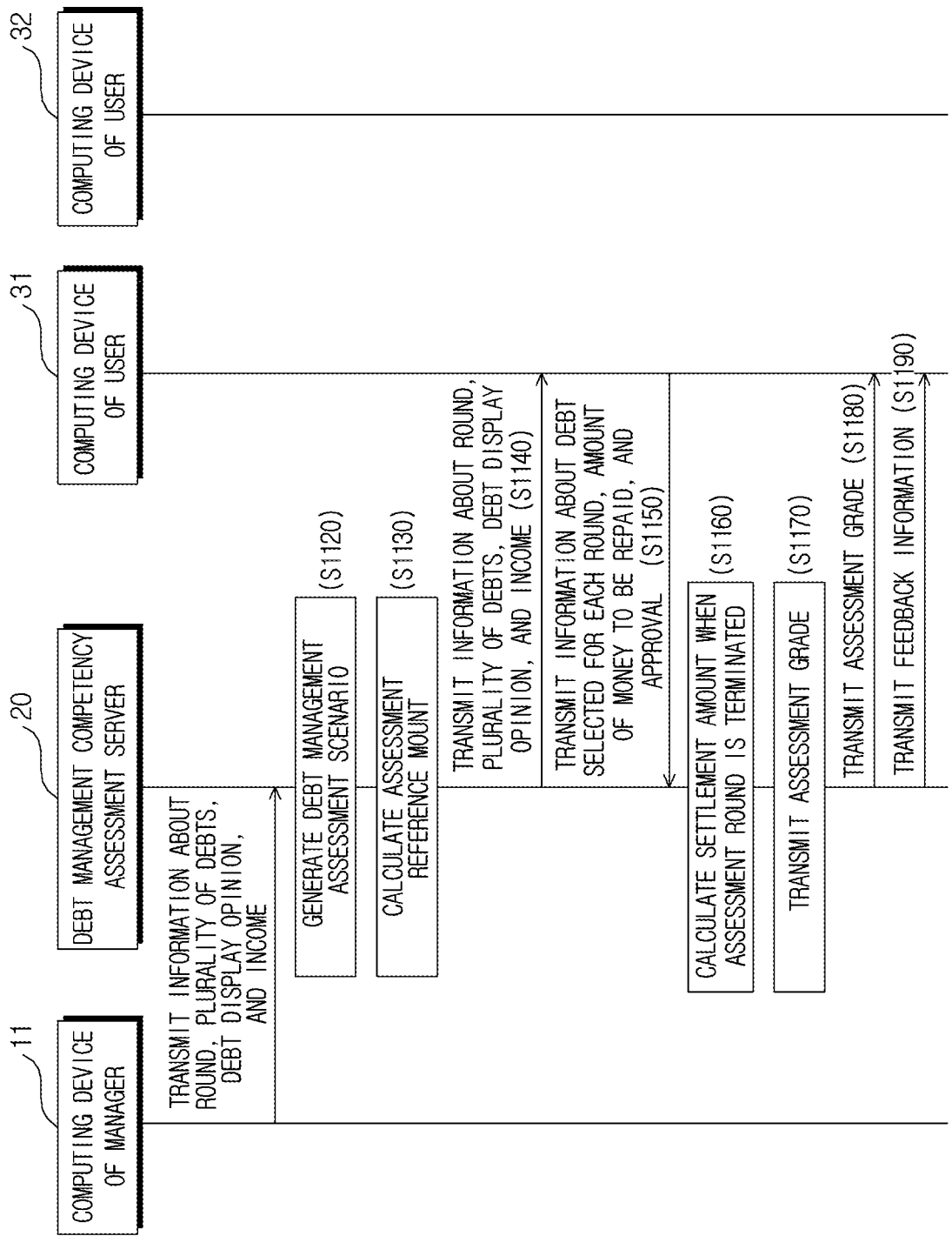
[FIG. 11]

[FIG. 12]
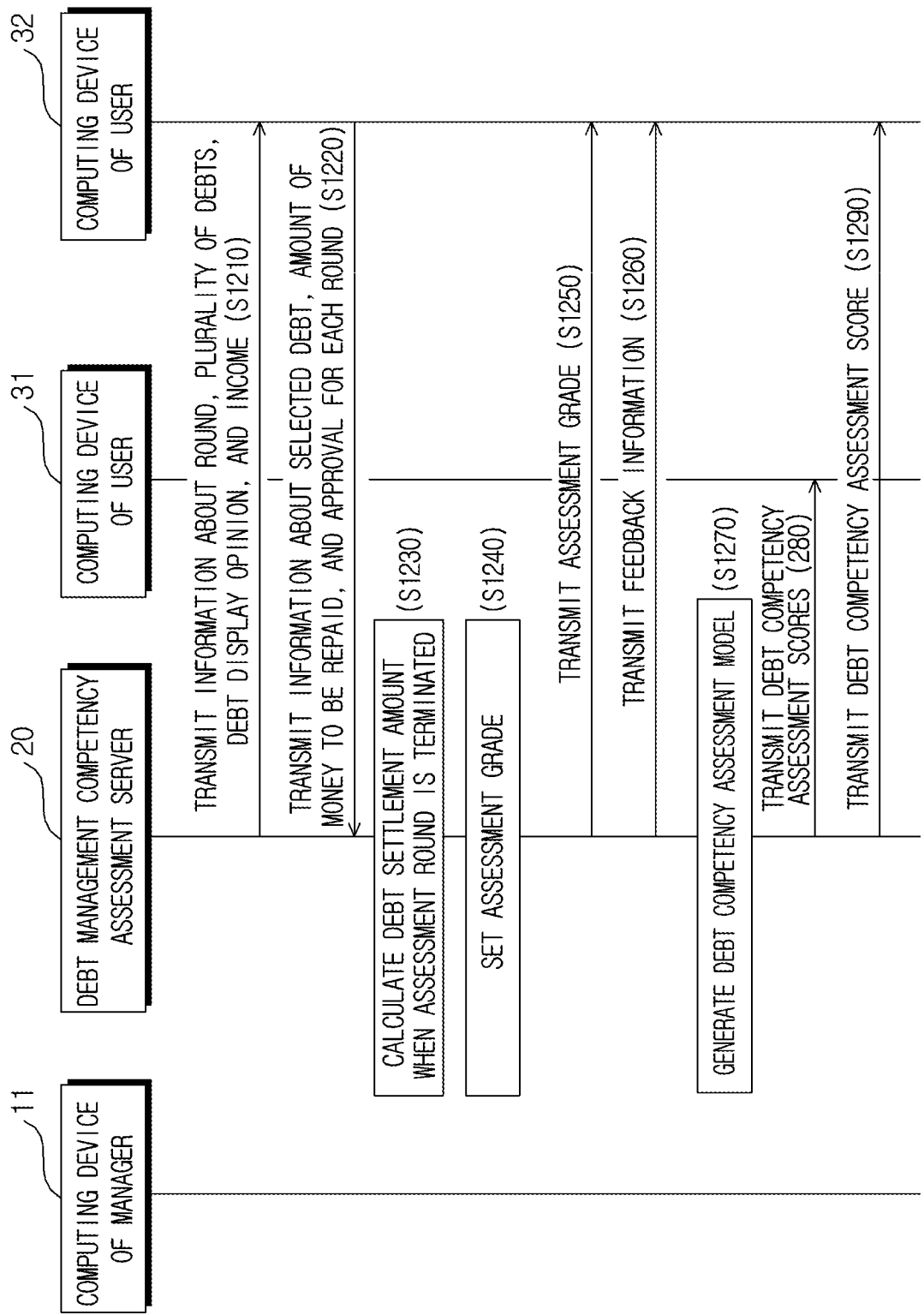

ASSESSMENT METHOD AND SERVER FOR DEBT MANAGEMENT COMPETENCY

CROSS-REFERENCE TO RELATED APPLICATIONS

This application claims priority under 35 U.S.C. § 119(a) to a Korean Patent Application No. 10-2017-0008063 filed in the Korean Intellectual Property Office on Jan. 17, 2017, the entire contents of which are incorporated herein by reference. Further, when this application claims the priority in other countries, other than the USA with the same reason, the entire contents of which are incorporated herein by reference.

TECHNICAL FIELD

The technical field, to which the present invention belongs, relates to a server and a method for assessing a debt management competency of an individual. The present invention corresponds to a result of a research project (project number: 1711037568) conducted by receiving a support from the National Research Foundation of Korea with a financial resource of the government (Ministry of Science, ICT, and Future Planning) in 2016, and corresponds to a result of a research project (project number: 1345249310) conducted by receiving a support of the National Research Foundation of Korea with a financial resource of the government (the Ministry of Education) in 2016.

BACKGROUND ART

Contents described herein simply provide background information about the present exemplary embodiment, and do not constitute the related art.

Household debts have emerged as a severe social and economic problem. Individuals cannot exclusively use their incomes for debt redemptions. There exists spending for maintaining an individual life, which is defined as consumption in economics. That is, in reality, the amount of money for debt redemption is changed according to an individual situation.

According to the ethological research, when people have plural debts, people irrationally redeem the debts. When it is necessary to redeem multiple debts, which have different interest rates and amounts of money, the most financially rational method is to preferentially redeem the debt having a large interest rate. However, in order to decrease psychological burdens, people tend to preferentially redeem the debt, of which the amount of money is small (debt account aversion (DAA)).

In order to solve the problem, there is a need for a method, which is capable of assessing a debt management competency of a person or a household and enhancing the debt management competency, but objective data and sufficient reference for determining the debt management competency have not been arranged yet.

SUMMARY OF THE INVENTION

The inventor of the present invention presents an Internet-based debt management competency reinforcement (DMCR) ICT platform, which is developed to assess a debt management competency of an individual and provide a customized feedback regarding one's debt management competency based on the results of the assessment.

The present invention has been made in an effort to provide a determination reference for inducing and educating an individual to rationally make a decision on a debt redemption by progressing the rounds by the predetermined number of times, selecting a specific debt among the plurality of debts and setting the amount of money to be repaid for the debt in an income for each round, setting an assessment grade for a user according to a debt settlement amount calculated in a final round, and providing a user with feedback information according to an assessment grade of one's competency.

Other objects of the present invention, which are not clearly stated, may be additionally considered within the range easily deducible from the detailed description and an effect thereof.

An exemplary embodiment of the present invention provides a method of assessing a debt management competency by a debt management competency assessing server used by one or more managers and a plurality of users, the method including: receiving information about a round, information about a plurality of debts, display option information about the plurality of debts to be displayed for each round, and information about an income from a computing device of the manager; generating a debt management competency assessment scenario based on the information about the round, the information about the plurality of debts, the display option information about the plurality of debts to be displayed for each round, and the information about the income; calculating an assessment reference amount for a total amount of the plurality of debts from the first round among the rounds to a predetermined assessment round based on the information about the round and the information about the plurality of debts for the debt management competency assessment scenario; transmitting the information about the round, the information about the plurality of debts, the display option information, and the information about the income to the computing devices of one or more users among the plurality of users participating in the debt management competency assessment scenario; receiving (i) one or more debts selected from the plurality of debts, (ii) the amount of money, which is to be repaid for the one or more selected debts, in the income, and (iii) approval information, based on which a present round among the rounds progresses to a next round from the computing devices of the one or more users for each round; when the predetermined assessment round is terminated, calculating a debt settlement amount for the plurality of debts based on (i) the one or more debts selected from the plurality of debts and (ii) the amount of money to be repaid for the one or more selected debts received up to the assessment round; and setting an assessment grade for the one or more users based on a difference between the debt settlement amount and the assessment reference amount, and transmitting the assessment grade to the computing devices of the one or more users.

Another exemplary embodiment of the present invention provides a server for assessing a debt management competency, the server including: an information transceiving unit configured to receive information about a round, information about a plurality of debts, display option information about the plurality of debts to be displayed for each round, and information about an income from a computing device of the manager; a scenario generating unit configured to generate a debt management competency assessment scenario based on the information about the round, the information about the plurality of debts, the display option information about the plurality of debts to be displayed for each round, and the information about the income; and an information processing unit configured to calculate an assessment reference amount for a total amount of the plurality of debts from the first round among the rounds to a predetermined assessment round based on the information about the round and the information about the plurality of debts for the debt management competency assessment scenario, in which the information transceiving unit transmits the information about the round, the information about the plurality of debts, the display option information, and the information about the income to the computing devices of one or more users among the plurality of users participating in the debt management competency assessment scenario, the information transceiving unit receives (i) one or more debts selected from the plurality of debts, (ii) the amount of money, which is to be repaid for the one or more selected debts, in the income, and (iii) approval information, based on which a present round among the rounds progresses to a next round from the computing devices of the one or more users for each round, the information processing unit calculates a debt settlement amount for the plurality of debts based on (i) the one or more debts selected from the plurality of debts and (ii) the amount of money to be repaid for the one or more selected debts received up to the assessment round when the predetermined assessment round is terminated, and sets an assessment grade for the one or more users based on a difference between the debt settlement amount and the assessment reference amount, and the information transceiving unit transmits the assessment grade to the computing devices of the one or more users.

Yet another exemplary embodiment of the present invention provides a method of assessing a debt management competency by a computing device, the method including: participating in a debt management competency assessment scenario generated by a debt management competency assessment server; receiving information about a round, information about a plurality of debts, display option information about the plurality of debts to be displayed for each round, and information about an income from the debt management competency assessment server; transmitting (i) one or more debts selected from the plurality of debts, (ii) the amount of money, which is to be repaid for the one or more selected debts, in the income, and (iii) approval information, based on which a present round among the rounds progresses to a next round for each round to the debt management competency assessment server; and when a predetermined assessment round is terminated, receiving a calculated assessment grade from the debt management competency assessment server.

As described above, according to the exemplary embodiments of the present invention, it is possible to provide a determination reference for inducing and educating an individual to rationally make a decision on a debt redemption by progressing the rounds by the predetermined number of times, selecting a specific debt among the plurality of debts and setting the amount of money to be repaid for the debt in an income for each round, setting an assessment grade for a user according to a debt settlement amount calculated in a final round, and providing a user with feedback information according to an assessment grade.

According to exemplary embodiments of the present invention, in view of an individual, a user experiences a debt redemption process through on-line, thereby self-learning his/her debt management competency and receiving a feedback from an expert, and in view of an enterprise, it is possible to predict and select a latent debt defaulter or a person lacking debt management competency and improve financial soundness.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a diagram illustrating a debt management competency assessment system according to exemplary embodiments of the present invention.

FIGS. 2 and 3 are block diagrams illustrating examples of debt management competency assessment servers according to exemplary embodiments of the present invention.

FIGS. 4 to 6 are diagrams illustrating information processed by the debt management competency assessment server according to exemplary embodiments of the present invention.

FIGS. 7 to 10 are diagrams illustrating examples of a screen of a computing device of a user according to another exemplary embodiment of the present invention.

FIGS. 11 and 12 are flowcharts illustrating a debt management competency assessment method according to exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

Hereinafter, in the description of the present invention, when it is determined that related known functions make unnecessarily obscure the main principle of the present invention as an apparent matter to those skilled in the art, a detailed description of the known functions is omitted, and some exemplary embodiments of the present invention will be described with the illustrative drawings in detail.

FIG. 1 is a diagram illustrating a debt management competency assessment system according to exemplary embodiments of the present invention. Referring to FIG. 1, the debt management competency assessment system includes a computing device 11 of one or more managers, a plurality of user computing devices 31, 32, and 33, a debt management competency assessment server 20, and a communication network 40.

The computing devices 11, 31, 32, and 33 of the manager or the users are electronic devices, which transmit data required for the processing by the debt management competency assessment server 20 and receive the processed data. The computing devices 11, 31, 32, and 33 may include a smart phone, a personal computer (PC), a tablet PC, a personal digital assistant (PDA), a laptop, and the like, but are not limited thereto.

The computing devices 11, 31, 32, and 33 of the manager or the users and the debt management competency assessment server 20 are connected through the communication network 40. The communication network 40 means a set of communication equipment connected for the purpose of enabling the computing devices 11, 31, 32, and 33 of the manager or the users and the debt management competency assessment server 20 to be communicated. The communication network 40 includes a node, a line, a trunk line, a satellite, and the like, which are connected to one another.

The computing devices 11, 31, 32, and 33 of the manager or the users may perform wired/wireless communication. For example, various communication protocols, such as near field wireless communication, remote wireless communication, mobile communication, and wireless LAN communication, may be used as the wireless communication. Examples of the wireless communication protocol may include near field communication (NFC), ZigBee, Bluetooth, Wi-Fi, WiMAX, global system for mobile communication (GSM), third generation (3G) mobile communication, and long term evolution (LTE), but the wireless communication protocol is not limited thereto.

The debt management competency assessment server 20 includes a database. The database means a type of data storage, in which it is possible to freely search for, extract, delete, edit, and add data. The database may be implemented to be suitable to the object of the present exemplary embodiment by using Oracle, Infomix Sybase, a relational database management system (RDBMS), Gemstone, Orion, and an object oriented database management system (OODBMS).

FIGS. 2 and 3 are block diagrams illustrating debt management competency assessment servers according to exemplary embodiments of the present invention, and as illustrated in FIG. 2, the debt management competency assessment server 200 includes an information transceiving unit 210, a scenario generating unit 220, and an information processing unit 230. The debt management competency assessment server 200 may omit some constituent elements among various constituent elements exemplarily illustrated in FIG. 2, or additionally include other constituent elements. Referring to FIG. 3, a debt management competency assessment server 300 may additionally include an assessment model generating unit 340.

The debt management competency assessment server 200 performs rounds by the predetermined number of times, selects a specific debt among the plurality of debts for each round and determines the amount of the debt to be repaid in an income, sets an assessment grade of a user according to a debt settlement amount calculated in a final round, and provides the user with feedback information according to the assessment grade. The information about the feedback for each section is illustrated in FIG. 6.

The debt management competency assessment server 200 generates a debt management competency assessment scenario. The debt management competency assessment scenario is generated based on a limitation condition set through the computing device 11 of the manager, and is a sort of simulation, in which the user computing devices 31, 32, and 33 may participate.

The information transceiving units 210 and 310 receive information about a round, information about the plurality of debts, display option information about the plurality of debts to be displayed for each round, and information about an income from the computing device 11 of the manager.

The information transceiving units 210 and 310 transmit the information about the round, the information about the plurality of debts, the display option information about the plurality of debts to be displayed for each round, and the information about the income to the computing device 31 of at least one user among the plurality of users participating in the debt management competency assessment scenario.

The information transceiving units 210 and 310 receive (i) one or more debts selected from the plurality of debts, (ii) the amount of money, which is to be repaid for the one or more selected debts, in the income, and (iii) approval information, based on which a present round among the rounds progresses to a next round from the computing device 31 of at least one user for each round. In relation to this, FIG. 7 illustrates a screen of the computing device 31 of the user.

The information transceiving units 210 and 310 transmit the assessment grades set by the information processing units 230 and 330 to the computing device 31 of at least one user. The information transceiving units 210 and 310 transmit predefined feedback information to the computing device 31 of at least one user according to an assessment grade. The feedback information is updated by the information processing units 230 and 330, and the information transceiving units 210 and 310 transmit the updated feedback information to the computing device 31 of the user.

The debt settlement amount of the final round is different according to a debt redemption strategy of the user. That is, the debt settlement amount has a value within a range from a maximum amount to a minimum amount according to a difference in the debt management competency. The debt management competency assessment server 200 provides the feedback information including a redemption strategy based on the debt management competency of the individual. For example, the redemption strategy is divided into a strategy non-use step, a large interest rate selection step, an all-in redemption step, and a complete redemption strategy step. The strategy non-use step corresponds to the case where the strategy is not used, and represents the largest debt settlement amount. The large interest rate selection step corresponds to the case where a debt having the largest interest rate is selected, and represents a smaller debt settlement amount than that of the strategy non-use step. The all-in redemption step corresponds to the case where all of the usable cashes are collected and repaid for the debt, and represents a smaller debt settlement amount than that of the large interest rate selection step. The complete redemption strategy step corresponds to the case where all existing strategies are used and maintained regardless of an external situation or circumstances, and represents a smaller debt settlement amount than that of the all-in redemption step as well as other steps described above.

The scenario generating units 220 and 320 generate debt management competency assessment scenarios based on the information about the round, the information about the plurality of debts, the display option information about the plurality of debts to be displayed for each round, and the information about the income.

The information processing units 230 and 330 calculate an assessment reference amount for the total amount of the plurality of debts from the first round among the rounds to a predetermined assessment round based on the information about the round and the information about the plurality of debts for the debt management competency assessment scenario. The predetermined assessment round may correspond to the last round among the rounds. The total amount of the plurality of debts may also be evaluated by an interim settlement in a predetermined round. The assessment reference amount is a minimized amount of the total amount of the plurality of debts, which is mathematically calculated by reflecting a corresponding interest rate to a principal of each of the plurality of debts according to the progress of the round. That is, the assessment reference amount represents a minimum redeemable debt amount under the condition about the limited round, the debt, and the income. A calculating formula of the assessment reference amount may be expressed with a relational formula between the number of rounds and a principal.

When the predetermined assessment round is terminated, the information processing units 230 and 330 calculate a debt settlement amount for the plurality of debts based on (i) the one or more debts selected from the plurality of debts and (ii) the amount of money to be repaid for the one or more selected debts received up to the assessment round. The information processing units 230 and 330 set an assessment grade for the user based on a difference between the debt settlement amount and the assessment reference amount. The assessment grade is set in consideration of a mistake (for example, an unintended saving) made in the middle of the scenario, a debt settlement order, a difference in a size between the interest rates, a difference in a size between the amounts of debts, a debt display option (hint), and the like. The factors may be set with weighted values.

The information processing units 230 and 330 link survey information about mathematical knowledge, financial knowledge, and various behavioral and psychological information of an individual received from the computing device 31 of at least one user and the debt settlement amount and update the feedback information. The survey information may include information about actual assets, an actual debt, and an actual income of at least one user. The information processing units 230 and 330 may calculate a weighted value and a redemption strategy about the actual debt based on the information about the actual assets, the actual debt, and the actual income of the user, and update the feedback information. Herein, the redemption strategy may be divided into the strategy non-use step, the large interest rate selection step, the all-in redemption step, and the complete redemption strategy step.

The assessment model generating unit 340 analyzes the information with a statistical method together with profile information about the plurality of users and generates a debt competency assessment model. The debt competency assessment model is generated based on (i) one or more debts selected from the plurality of debts, (ii) the amount of money, which is to be repaid for the one or more selected debts, in the income, and (iii) approval information, based on which a present round among the rounds progresses to a next round, which the information transceiving units 210 and 310 receive from the computing devices 31 of the plurality of users for each round. The debt competency assessment model is learned in consideration of a mistake (for example, an unintended saving) made in the middle of the scenario, a debt settlement order, a difference in a size between the interest rates, a difference in a size between the amounts of debts, a debt display option (hint), and the like.

The constituent elements included in the debt management competency assessment server are separately illustrated in FIGS. 1 and 2, but the plurality of constituent elements may be mutually combined to be implemented as at least one module. The constituent elements are connected to a communication path connecting a software module or a hardware module within the server and are organically operated with one another. The constituent elements communicate by using one or more communication buses or signal lines.

The debt management competency assessment server may be implemented within a logic circuit by hardware, firmware, software, or a combination thereof, and may also be implemented by using a universal or a specific-purpose computer. The server may be implemented by using a hardwired device, a field programmable gate array (FPGA), an application specific integrated circuit (ASIC), and the like. Further, the server may be implemented with a system on chip (SoC) including one or more processors and controllers.

The debt management competency assessment server may be mounted in a computing device or a server, in which a hardware element is provided, in a form of software, hardware, or a combination thereof. The computing device or the server may mean various devices including all or a part of a communication device including a communication modem for performing communication with various devices or a wired/wireless communication network, a memory storing data for executing a program, and a microprocessor for executing the program and performing a calculation and making a command.

FIGS. 4 to 6 are diagrams illustrating information processed by the debt management competency assessment server according to exemplary embodiments of the present invention. The information may be set through the computing device 11 of the manager.

Referring to FIG. 4, the debt display option, that is, the display option information, may be (i) a first display mode (normal mode), which provides a principal and an interest rate of each of the plurality of debts in the present round among the rounds, (ii) a second display mode (retrospective mode), which provides an accumulated interest amount for each of the plurality of debts from the first round to a previous round of the present round, (iii) a third display mode (prospective mode), which provides the interest amount generated for each of the plurality of debts in a next round of the present round, or (iv) a combination thereof (retroprospective mode). The interest information of the past, the present, and the future is a hint for making a decision by the user.

The information about the round includes the number of rounds. Referring to FIG. 4, the largest round may be set. The round progresses in one direction and is not circulated. That is, the round progresses from the present round to the next round, and cannot progress from the present round to the previous round. The user may make one decision for each round. The round in the scenario corresponds to one year in reality, and it is possible to recognize a tendency of the user about a scheme, with which the user will annually redeem the debt.

Referring to FIGS. 4 and 5, the debt management competency assessment scenario may additionally include at least one of profile information (not illustrated), bonus information, saving information, elapsed time, and initial asset information of the user. The profile information of the user includes at least one of a nationality, a gender, an age, a job, and a major.

The information about the plurality of debts includes identification information, a principal, and an interest rate of each of the plurality of debts. At least one of a principal and an interest rate is different between two or more debts among the plurality of debts. It is possible to recognize a decision making tendency of the user, who tends to redeem the multiple debts, of which the principals are differently set.

The information about the income includes cash information provided for each round. At least one of the interest rate of the plurality of debts and the income may be set to be varied in at least one of the rounds. Through the setting, a level of difficulty of the scenario may be changed. By configuring various scenarios, it is possible to accurately recognize a decision making tendency of an individual or a group.

FIGS. 7 to 10 are diagrams illustrating examples of a screen of the computing device of the user according to another exemplary embodiment of the present invention. The debt management competency assessment method may be performed by the computing device of the user.

The computing device of the user participates in the debt management competency assessment scenario generated by the debt management competency assessment server. The computing device of the user receives information about a round, information about the plurality of debts, display option information about the plurality of debts to be displayed for each round, and information about an income from the debt management competency assessment server. Referring to FIG. 7, the computing device of the user provides the information about the round, the information about the plurality of debts, the display option information about the plurality of debts to be displayed for each round, and the information about the income.

The computing device of the user transmits (i) one or more debts selected from the plurality of debts, (ii) the amount of money, which is to be repaid for the one or more selected debts, in the income, and (iii) approval information, based on which a present round among the rounds progresses to a next round for each round to the debt management competency assessment server.

FIG. 8 illustrates debt information of the present round, and FIG. 9 illustrates debt information of the final round. A maximum interest increased amount illustrated in FIG. 8 represents a maximum interest amount generated in a next round when any amount is not repaid for the corresponding debt in the present round. This corresponds to the third display mode in the display option.

When the predetermined assessment round is terminated, the computing device of the user receives the calculated assessment grade from the debt management competency assessment server.

The debt management competency assessment method may additionally include an operation of receiving a debt settlement amount for the plurality of debts together with the assessment grade from the debt management competency assessment server, displaying an average debt settlement amount based on the debt settlement amount, and displaying the debt settlement amount according to the round in a graph. Through the graph and the user statistics illustrated in FIG. 10, the user may easily recognize his/her debt redemption history and decision making tendency in the scenario.

The debt management competency assessment method may receive the feedback information predefined according to the assessment grade from the debt management competency assessment server. In the debt management competency assessment method, the feedback information, which is updated through the linkage between the survey information about mathematical knowledge, financial knowledge, and various behavioral and psychological information of an individual input by the user and the debt settlement amount, may be received.

FIGS. 11 and 12 are flowcharts illustrating a debt management competency assessment method according to exemplary embodiments of the present invention. The debt management competency assessment method may be performed by the debt management competency assessment server or the computing device.

In operation S1110, the computing device 11 of the manager transmits information about a round, a plurality of debts, a debt display option, and an income to the debt management competency assessment server 20. The debt management competency assessment server 20 receives the information about the round, the information about the plurality of debts, the display option information, and the information about the income from the computing device 11 of the manager.

In operation S1120, the debt management competency assessment server 20 generates a debt management competency assessment scenario based on the information about the round, the information about the plurality of debts, the display option information about the plurality of debts to be displayed for each round, and the information about the income. The information about the round includes the number of rounds, and the round progresses in one direction and is not circulated. The information about the plurality of debts includes identification information, a principal, and an interest rate of each of the plurality of debts. At least one of a principal and an interest rate is different between two or more debts among the plurality of debts. The information about the income includes cash information provided for each round. At least one of the interest rate of the plurality of debts and the income may be set to be varied in at least one of the rounds.

The display option information may be (i) a first display mode, which provides a principal and an interest rate of each of the plurality of debts in the present round among the rounds, (ii) a second display mode, which provides an accumulated amount of interest for each of the plurality of debts from the first round to a previous round of the present round, (iii) a third display mode, which provides the amount of interest generated for each of the plurality of debts in a next round of the present round, or (iv) a combination thereof.

The debt management competency assessment scenario may additionally include at least one of profile information, initial asset information, bonus information, and saving information of the user, and elapsed time. The profile information of the user includes at least one of a nationality, gender, an age, a job, and a major.

In operation S1130, the debt management competency assessment server 20 calculates an assessment reference amount for the total amount of the plurality of debts from the first round of the rounds to a predetermined assessment round based on the information about the round and the information about the plurality of debts for the debt management competency assessment scenario. The predetermined assessment round may be the last round among the rounds. The assessment reference amount is a minimized amount of the total amount of the plurality of debts, which is mathematically calculated by reflecting a corresponding interest rate to a principal of each of the plurality of debts according to the progress of the round.

In operation S1140 or S1210, the debt management competency assessment server 20 transmits the information about the round, the information about the plurality of debts, the display option information, and the information about the income to the computing devices 31 and 32 of the one or more users among the plurality of users participating in the debt management competency assessment scenario.

In operation S1150 or S1220, the debt management competency assessment server 20 receives (i) one or more debts selected from the plurality of debts, (ii) the amount of money, which is to be repaid for the one or more selected debts, in the income, and (iii) approval information, based on which a present round among the rounds progresses to a next round for each round from the one or more computing devices 31 and 32 of the users.

In operation S1160 or S1230, when the predetermined assessment round is terminated, the debt management competency assessment server 20 calculates a debt settlement amount for the plurality of debts based on (i) one or more debts selected from the plurality of debts and (ii) the amount of money to be repaid for the one or more selected debts received up to the assessment round.

In operation S1170 or S1240, the debt management competency assessment server 20 sets an assessment grade for one or more users based on a difference between the debt settlement amount and the assessment reference amount.

In operation S1180 or S1250, the debt management competency assessment server 20 transmits the assessment grade to the computing devices 31 and 32 of the one or more users.

The debt management competency assessment method additionally includes an operation of transmitting predefined feedback information to the computing devices of the one or more users according to an assessment grade. The debt management competency assessment method may link survey information about mathematical knowledge, financial knowledge, and various behavioral and psychological information of an individual received from the computing device of at least one user and the debt settlement amount and update the feedback information before or after the operation of generating the debt management competency assessment scenario. The survey information includes information about actual assets, an actual debt, and an actual income of at least one user.

The debt management competency assessment method may additionally include an operation of calculating a weighted value about the actual debt and a redemption strategy based on the information about the actual assets, the actual debt, and the actual income of the user and updating feedback information, and transmitting the updated feedback information to the computing device of the user.

The debt management competency assessment method may additionally include an operation S1270 of generating a debt competency assessment model. The debt competency assessment model is generated by receiving (i) the one or more debts selected from the plurality of debts, (ii) the amount of money, which is to be repaid for the one or more selected debts, in the income, and (iii) the approval information, based on which the present round among the rounds progresses to the next round from the computing devices 31 and 32 of the plurality of users for each round, and analyzing (i), (ii), and (iii) together with the profile information about the plurality of users by a statistical method. The debt management competency assessment method may additionally include an operation of scoring the debt management competencies of the plurality of users by using the debt competency assessment model.

In operation S1280 or S1290, the debt management competency assessment server 20 transmits the debt management competency assessment score to the computing devices 31 and 32 of the one or more users.

In FIGS. 11 and 12, it is described that the respective processes are sequentially executed, which is, however, illustrative, and those skilled in the art may variously correct and modify and apply the present invention by changing the order described in FIGS. 11 and 12 and executing the processes, or executing one or more processes in parallel or adding another process within the scope without departing from the essential characteristic of the exemplary embodiment of the present invention.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of assessing a debt management competency implemented by a debt management competency assessing server including a communication modem, a processor and a non-transitory computer-readable medium storing instructions that, when executed by the processor, cause the server to operate the method the server used by a manager and a plurality of users, the method comprising:

displaying, by a computing device of the manager, display option information about a plurality of debts to be displayed for each round of a plurality of rounds, wherein the display option information includes information of (i) a normal display mode which provides a principal and an interest rate of each of the plurality of debts in a present round among the rounds, (ii) a retrospective display mode which provides and accumulated interest amount for each of the plurality of debts from a first round among the rounds to a previous round among the rounds, (iii) a prospective display mode which provides an interest amount generated for each of the plurality of debts in a next round among the rounds, and (iv) a combined display mode which is a combination of the retrospective display mode and the prospective display mode;

setting, by the computing device of the manager, a display mode among the normal display mode, the retrospective display mode, the prospective display mode and the combined display mode;

receiving, by the communication mode, information about the rounds, information about the plurality of debts, information about the display mode set by the computing device of the manager, and information about an income from the computing device of the manager;

generating, by the processor, a debt management competency assessment scenario according to a limitation condition set through the computing device of the manager based on the information about the rounds, the information about the plurality of dents, the information about the display mode set by the computing device of the manager, and the information about the income;

based on the information about the rounds and the information about the plurality of debts for the debt management competency assessment scenario, calculating, by the processor, an assessment reference amount for a total amount of the plurality of debts from the first round among the rounds to a predetermined assessment round among the rounds;

transmitting, by the communication modem, the information about the rounds, the information about the plurality of debts, the information about the display mode set by the computing device of the manager, and the information about the income to a computing device of a user among the plurality of users participating in the debt management competency assessment scenario;

receiving, by the communication modem, (i) one or more debts selected from the plurality of debts, (ii) the amount of money, which is to be repaid for the one or more selected debts, in the income, and (iii) approval information, based on which the present round among the rounds progresses to the next round from the computing device of the user for each round of the rounds;

when the predetermined assessment round is terminated, calculating, by the processor, a debt settlement amount for the plurality of dents based on (i) the one or more debts selected from the plurality of dents and (ii) the amount of money to be repaid for the one or more selected debts received up to the assessment round; and setting, by the processor, an assessment grade for the user based on a difference between the debt settlement amount and the assessment reference amount, and transmitting, by the communication modem, the assessment grade to the computing device of the user, wherein the information about the plurality of dents includes the principal and the interest rate of each of the plurality of debts and the principal is different among two or more debts of the plurality of debts, and wherein the assessment grade for the user is set based on factors including a debt settlement order, a difference in a size between the interest rates of the plurality of debts, and a difference in size between amounts of the plurality of debts, the factors being set with weighted values.

2. The method of claim 1, wherein the information about the rounds includes the number of the rounds, and the rounds progress in one direction and are not circulated.

3. The method of claim 1, wherein the information about the plurality of debts includes identification information.

4. The method of claim 1, wherein the information about the income includes cash information provided for each round of the rounds.

5. The method of claim 1, wherein the debt management competency assessment scenario additionally includes at least one of profile information, initial asset information, bonus information, and saving information of the user, elapsed time, or combination thereof, the profile information of the user includes a nationality, gender, an age, a job, a major, or combination thereof, and the interest rate of each of the plurality of debts, the income, or combinations thereof is set to be varied in at least one of the rounds.

6. The method of claim 1, wherein the predetermined assessment round is the last round among the rounds.

7. The method of claim 1, wherein the assessment reference amount is a minimized amount of the total amount of the plurality of debts, which is mathematically calculated by reflecting a corresponding interest rate to a principal of each of the plurality of debts according to the progress of the rounds.

8. The method of claim 1, further comprising:
transmitting feedback information predefined according to the assessment grade to the computing device of the user, wherein the feedback information is updated by linking survey information about mathematical knowledge, financial knowledge, and various behavioral and psychological information of an individual received from the computing device of the user and the debt settlement amount before or after the generating of the debt management competency assessment scenario.

9. The method of claim 8, wherein the survey information includes information about actual assets, an actual debt, and an actual income of the user, and the method further comprises calculating a weighted value about the actual debt and a redemption strategy based on the information about the actual assets, the actual debt, and the actual income of the user and updating the feedback information, and transmitting the updated feedback information to the computing device of the user.

10. The method of claim 1, further comprising:
generating a debt competency assessment model by receiving (i) the one or more debts selected from the plurality of debts, (ii) the amount of money, which is to be repaid for the one or more selected debts, in the income, and (iii) the approval information, based on which the present round among the rounds progresses to the next round from computing devices of the plurality of users for each round of the rounds, and analyzing (i), (ii), and (iii) together with the profile information about the plurality of users by a statistical method; and scoring the debt management competencies of the plurality of users by using the debt competency assessment model.

11. A server for assessing a debt management competency including a communication modem, a processor and a non-transitory computer-readable medium storing instructions that, when executed by the processor, cause the server to operate, the server comprising:

the communication modem configured to receive information about rounds, information about a plurality of debts, display option information about the plurality of debts to be displayed for each round of the rounds, and information about an income from a computing device of a manager, wherein the display option information is displayed by the computing device of the manager, and the display option information includes information of (i) a normal display mode which provides a principal and an interest rate of each of the plurality of debts in a present round among the rounds, (ii) a retrospective display mode which provides an accumulated interest amount for each of the plurality of debts from a first round among the rounds to a previous round among the rounds, (iii) a prospective display mode which provides the interest amount generated for each of the plurality of debts in a next round among the rounds, and (iv) a combined display mode which is a combination of the retrospective display mode and the prospective display mode, the prospective display mode and the combined display mode is set by the computing device of the manager, and the received display option information is information of the display mode set by the computing device of the manager;

the processor configured to generate a debt management competency assessment scenario according to a limitation condition set through the computing device of the manager based on the information about the rounds, the information about the plurality of debts, the information of the display mode set by the by the computing device of the manager, and the information about the income; and the processor configured to, based on the information about the rounds and the information about the plurality of debts for the debt management competency assessment scenario, calculate an assessment reference amount for a total amount of the plurality of debts from the first round among the rounds to a predetermined assessment round among the rounds, wherein the communication modem transmits the information about the rounds, the information about the plurality of debts, the information of the display mode set by the by the computing device of the manager, and the information about the income to a computing device of a user among a plurality of users participating in the debt management competency assessment scenario, the communication modem receives (i) one or more debts selected from the plurality of debts, (ii) the amount of money, which is to be repaid for the one or more selected debts, in the income, and (iii) approval information, based on which the present round among the rounds progresses to the next round from the computing device of the user for each round of the rounds, when the predetermined assessment round is terminated, the processor calculates a debt settlement amount for the plurality of debts based on (i) the one or more debts selected from the plurality of debts and (ii) the amount of money to be repaid for the one or more selected debts received up to the assessment round; and sets an assessment grade for the user based on a difference between the debt settlement amount and the assessment reference amount, and the communication modem transmits the assessment grade to the computing device of the user, wherein the information about the plurality of debts includes-f the principal and the interest rate of each of the plurality of debts, and the principal is different among two or more debts of the plurality of debts, and wherein the assessment grade for the user is set based on factors including a debt settlement order, a difference in a size between interest rates of the plurality of debts, and a difference in a size between amounts of the plurality of debts, the factors being set with weighted values.

12. The server of claim 11, wherein the information about the plurality of debts includes identification information.

13. The server of claim 11, wherein the debt management competency assessment scenario additionally includes profile information, initial asset information, bonus information, and saving information of the user, elapsed time, or combination thereof, the profile information of the user includes a nationality, gender, an age, a job, a major, or combination thereof, and the interest rate of each of the plurality of debts, the income, or combinations thereof is set to be varied in at least one of the rounds.

14. The server of claim 11, wherein the communication modem transmits feedback information predefined according to an assessment grade to the computing device of the user, and the processor links survey information about mathematical knowledge, financial knowledge, and various behavioral and psychological information of an individual received from the computing device of the user and the debt settlement amount and updates the feedback information.

15. The server of claim 14, wherein the survey information includes information about actual assets, an actual debt, and an actual income of the user, the processor calculates a weighted value about the actual debt and a redemption strategy based on the information about the actual assets, the actual debt, and the actual income of the user and updates the feedback information, and the communication modem transmits the updated feedback information to the computing device of the user.

16. The server of claim 11, comprising:

the processor configured to generate a debt competency assessment model by receiving (i) the one or more debts selected from the plurality of debts, (ii) the amount of money, which is to be repaid for the one or more selected debts, in the income, and (iii) the approval information, based on which the present round among the rounds progresses to the next round from computing devices of the plurality of users for each round of the rounds, and analyzing (i), (ii), and (iii) together with the profile information about the plurality of users by a statistical method, wherein the processor scores the debt management competencies of the plurality of users by using the debt competency assessment model.

* * * * *